United States Patent [19]
Hoffmeister

[11] Patent Number: 6,017,629
[45] Date of Patent: Jan. 25, 2000

[54] AMORPHOUS MICROPOROUS OXIDIC SOLIDS, PROCESS FOR PRODUCING THEM AND THEIR USE

[75] Inventor: Michael Hoffmeister, Hanover, Germany

[73] Assignee: Engelhard Corporation, Iselin, N.J.

[21] Appl. No.: 08/765,476

[22] PCT Filed: Jun. 28, 1995

[86] PCT No.: PCT/EP95/02517

§ 371 Date: Mar. 11, 1997

§ 102(e) Date: Mar. 11, 1997

[87] PCT Pub. No.: WO96/00697

PCT Pub. Date: Jan. 11, 1996

[30] Foreign Application Priority Data

Jun. 29, 1994 [DE] Germany ............................ 44 22 715

[51] Int. Cl.$^7$ ...................................................... B32B 5/16
[52] U.S. Cl. ............................ 428/402; 501/80; 501/81; 528/10; 528/31; 528/35; 528/33
[58] Field of Search ........................ 501/80, 81; 428/402; 528/10, 31, 35, 33

[56] References Cited

U.S. PATENT DOCUMENTS

| | | | |
|---|---|---|---|
| 3,297,414 | 1/1967 | Mazdiyasni et al. | 23/345 |
| 4,622,311 | 11/1986 | Wakui et al. | 502/235 |
| 4,818,732 | 4/1989 | Fox et al. | 501/81 |
| 5,075,090 | 12/1991 | Lewis et al. | 423/337 |
| 5,108,732 | 4/1992 | Krumbe et al. | 423/592 |
| 5,330,734 | 7/1994 | Johnson et al. | 423/328.3 |
| 5,338,716 | 8/1994 | Triplett et al. | 502/64 |
| 5,447,624 | 9/1995 | Ichikawa et al. | 210/198.2 |
| 5,563,212 | 10/1996 | Dismukes et al. | 524/786 |
| 5,643,987 | 7/1997 | Dismukes et al. | 524/442 |
| 5,696,217 | 12/1997 | Dismukes et al. | 528/10 |

FOREIGN PATENT DOCUMENTS

| | | |
|---|---|---|
| 1240972 | 8/1988 | Canada . |
| 2031330 | 6/1991 | Canada . |
| 63-139006 | 6/1988 | Japan . |
| WO 94/13585 | 6/1994 | WIPO . |

*Primary Examiner*—Margaret G. Moore

[57] ABSTRACT

This present invention relates to microporous oxidic solids based on organofunctional compounds of metals, transition metals and semiconductor elements, preferably elements of the third and fourth main group and/or the fourth sub-group of the periodic system of elements, which are produced by tempering and calcining said compounds in an oxygen or ozone-containing gas atmosphere, and their use as adsorbent, for substance separation, as catalyst or as catalyst carrier material. The solids have a pore size of 0.3 to 2 nm, a pore volume of 0.05 to 0.9 ml/g and a BET surface of 10 to 1,000 m$^2$/g.

20 Claims, 4 Drawing Sheets

AMORPHOUS MICROPOROUS OXIDIC SOLIDS, PROCESS FOR PRODUCING THEM AND THEIR USE

The present invention relates to amorphous microporous oxidic solids based on organofunctional compounds of metals, transition metals and semiconductor elements and a process for their production and their use as adsorbents, for substance separation, as catalysts or catalyst carrier materials.

German patent applications DE-OS 2 155 281 and DE-OS 2 357 184 disclose the preparation of porous silicon dioxides by subjecting tetraalkoxysilanes or polyalkoxysiloxanes, optionally together with organoalkoxysilanes, to hydrolytic polycondensation.

Furthermore, it is known that porous solids can be produced by hydrothermal synthesis or according to the sol-gel process. The solids produced in this manner are, however, either X-crystalline or X-amorphous and have a small portion of micropores.

According to German patent application DE-AS 1 038 015, it is possible to produce crystalline aluminosilicate by intermixing sodium aluminate solution and sodium silicate solution under formation of gel and by crystallizing the same.

Amorphous aluminosilicates can be produced by analogy with the method described in German application 2 917 313. An aluminate solution and a silicate solution are combined there.

When the mixture is immediately fed into a precipitation oil, beaded bodies of amorphous aluminosilicate are formed.

The porous solids which have so far been known are often non-specific in their effect, hardly selective and sensitive to mechanical or chemical action, such as hydrolytic attack.

The following pore classes are used for characterizing the porous solids according to the IUPAC classification (dp=mean pore diameter).

| micropores | $dp < 2$ nm |
|---|---|
| mesopores | $2$ nm $< dp < 50$ nm |
| macropores | $dp > 50$ nm |

The pore distribution can be determined by using different known methods, e.g., by adsorbing gases and vapors and by evaluating the resulting sorption isotherms according to the Horwath-Kawazoe, BET or Kelvin method, especially for determining the micro- and mesopore distribution, or by mercurcy porosimetry for measuring the pore distribution of macropores and large mesopores.

It has been the object of the present invention to provide porous solids having a predominant portion of micropores and a process for producing the same.

In accordance with the invention, the object is achieved by microporous oxidic solids based on organofunctional compounds of metals, transition metals and/or semiconductor elements, preferably elements of the third and fourth main group and/or the fourth sub-group of the periodic system of elements, which solids were produced by tempering or calcining such compounds and have a pore size of 0.3 to 2 nm, a pore volume of 0.05 to 0.9 ml/g and a BET surface of 10 to 1000 m²/g.

BRIEF DESCRIPTION OF THE DRAWINGS

The figures show the sorption isotherms and pore volume distribution curves of samples 4, 5 and 7, as shown in Table 1 below.

The microporous solids of the invention are X-amorphous.

Figure 1:
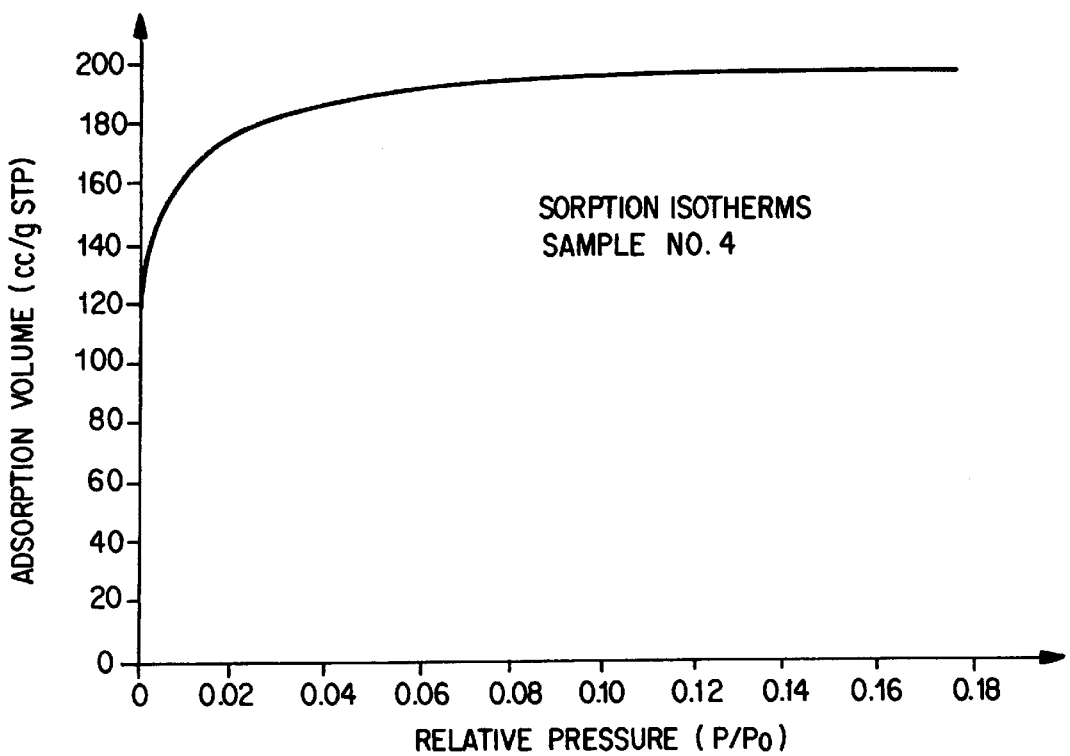
Figure 2:
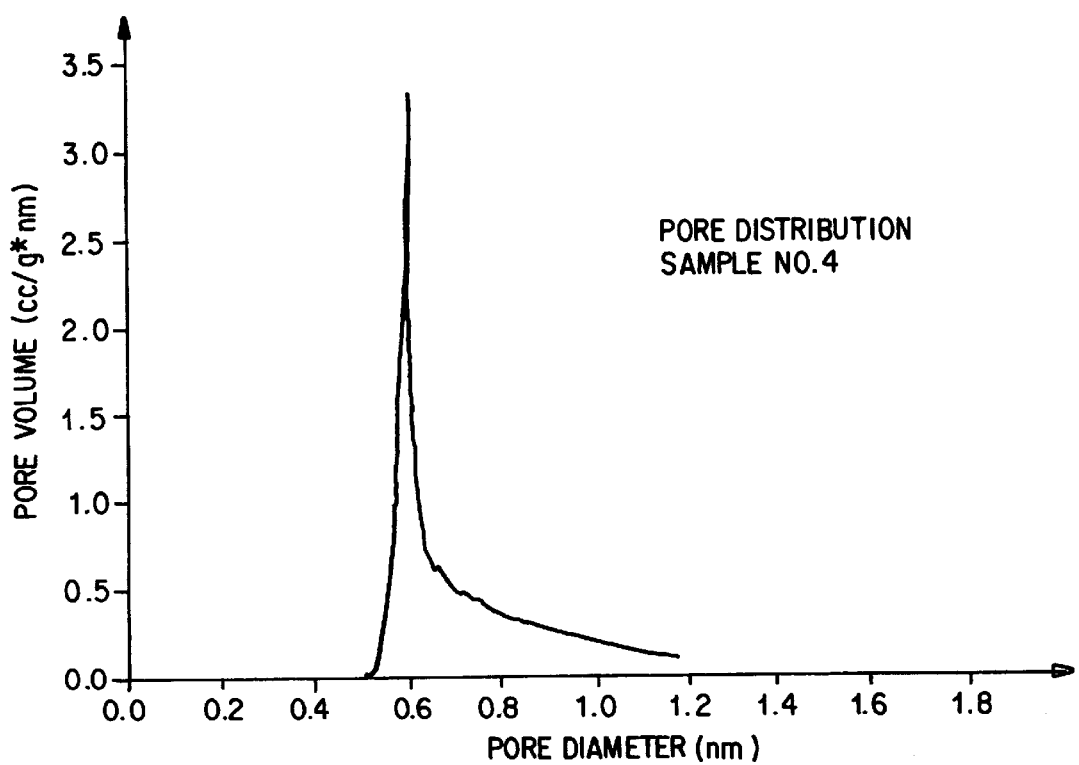
Figure 3:
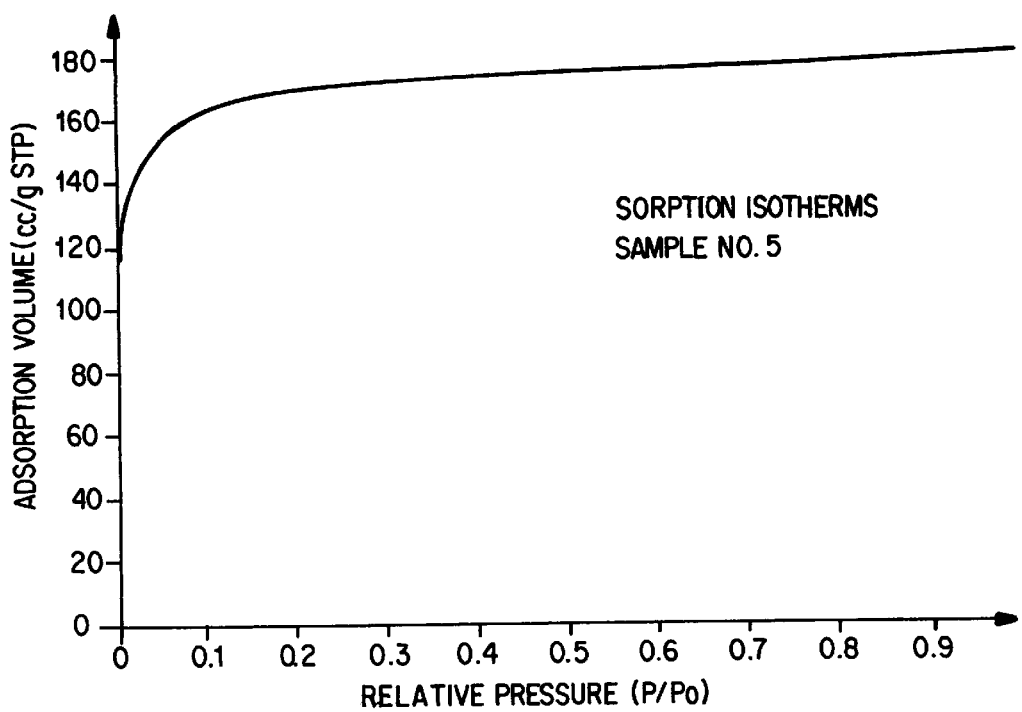
Figure 4:
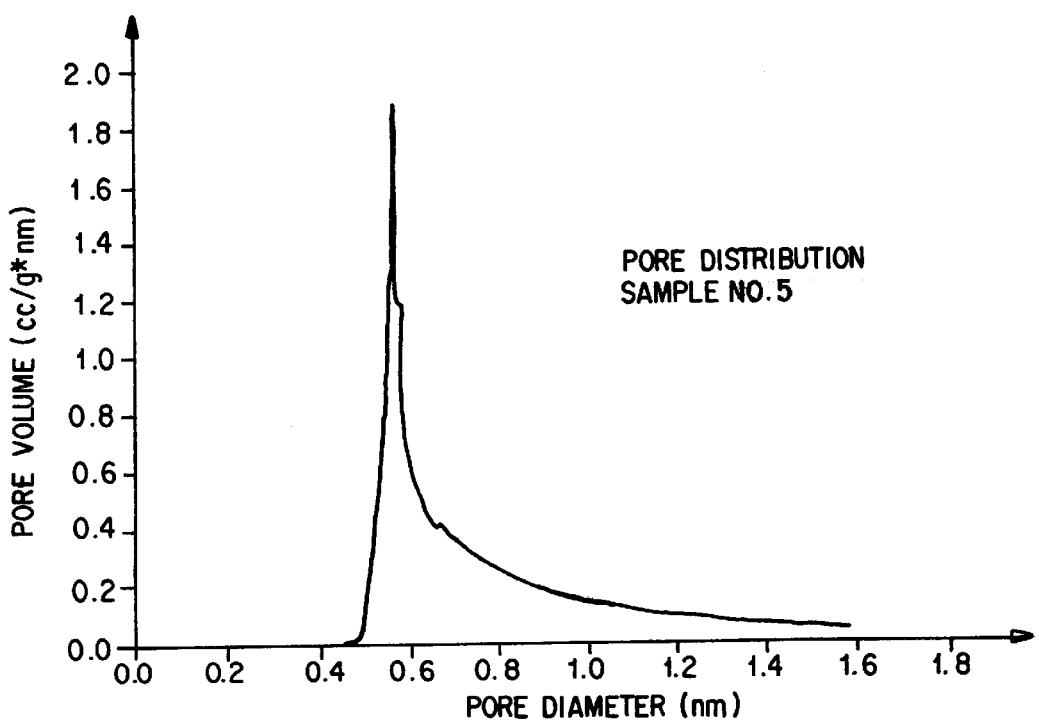
Figure 5:
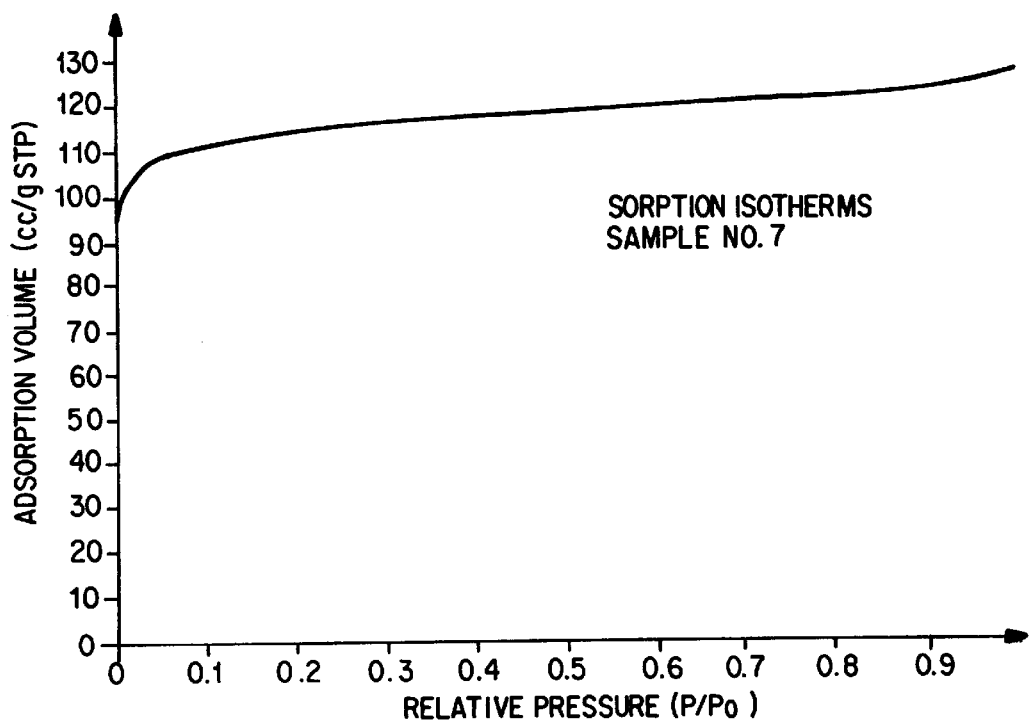
Figure 6:
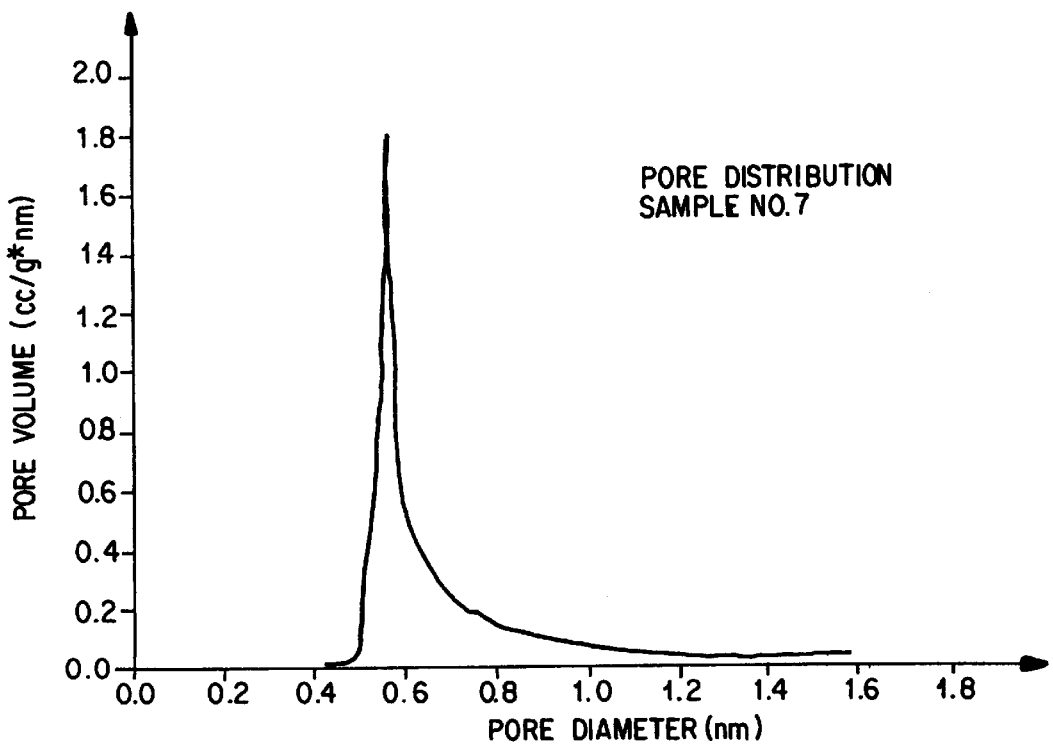
Figure 7:
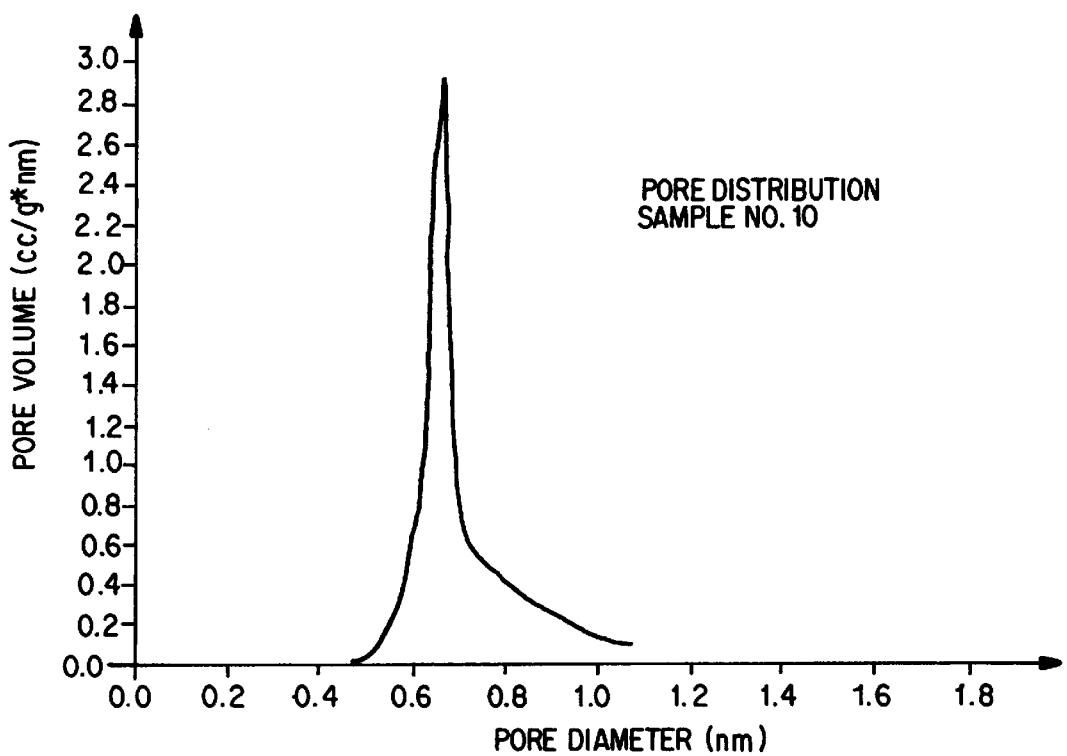
Figure 8:
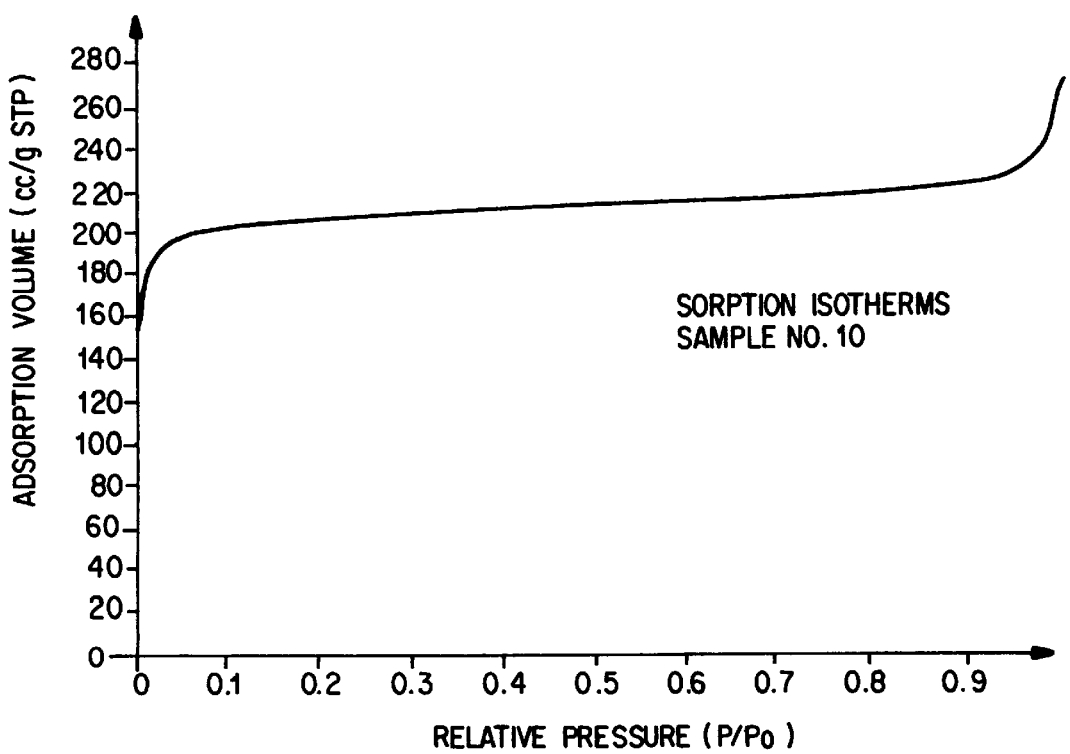

In accordance with the invention, the microporous solids are produced by thermally decomposing organofunctional compounds, preferably elements of the third and fourth main group or the fourth sub-group of the periodic system of elements in the presence of ozone, oxygen and/or air at 100 to 600° C., preferably at 200 to 500° C.

The reaction can also take place at ambient temperature, which, however, will entail a prolongation of the reaction time.

Organofunctional compounds within the meaning of the present invention are preferably compounds containing silicon, titanium, hafnium, zircon, aluminum or germanium.

The starting compounds can generally be described by formula I $$MX_aR_b \qquad (I)$$

wherein

M represents metals, transition metals or semiconductor elements of the third, fourth main group or the fourth sub-group of the periodic system of elements, X hydrogen, halogen or —OR$^1$, R alkyl, alkylene, aryl, alkyl aryl, R$^1$ hydrogen, alkali metal, alkyl, alkyl alkoxy or aryl, a 1 to 4, b 4–a.

Moreover, in the above formula I, R can stand for non-metal-containing elements or chemical groups. Compounds of such an embodiment are, e.g., bis(3-triethoxysilylpropyl)tetrasulfane, 3-aminopropyl-triethoxysilane, phosphoric acid-p,p-dimethyl-trimethylsilylester.

In another preferred variant of the present invention, dimethylphenylsilane, dichlorodiphenylsilane, vinyl triethoxysilane, sodium trimethylsiliconate, tetraethoxysilane, hexadecyltrimethoxysilane, octyltrimethoxysilane, oligomeric methyl-1-octylmethoxysilane, tetrapropylsilicate, aluminum isopropylate, tetrabutylorthotitanate, tetrabutylzirconate or iron acetylacetonate are used as starting compounds.

In another preferred variant, special organofunctional compounds of the silicon may be used as starting compounds for the microporous oxidic solids according to the invention.

Siloxanes or polysiloxanes represented by the general formula II $$R_3{}^2Si-(O-SiR_2{}^2)_n-O-SiR_3{}^2 \qquad (II)$$

wherein

R$^2$ represents hydrogen, alkyl, aryl or alkyl alkoxy, n 0; 1 up to >100, wherein R$^2$ in different units of one and the same polysiloxane can also have different meanings, are preferably used as starting compounds. Preferred compounds of the general formula II are, for instance, hexaethyldisiloxane or octamethylcyclotetrasiloxane.

Cross-linked polyorganosiloxanes represented by the general formula III $$(R_2{}^3SiO)_x \qquad (III)$$

wherein

R$^3$ represents alkyl, aryl or alkyl aryl x>100
wherein R³ in different units of one and the same polysiloxane can also have different meanings, are used as further starting compounds within the meaning of the invention. Preferrred compounds of the general formula III are, e.g., silicones or silicone rubbers, especially poly(dimethylsiloxane) or poly(methylphenylsiloxane).

Polycarbosilanes represented by the general formula IV

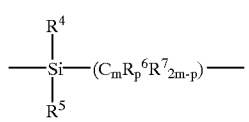
(IV)

wherein
R⁴ represents hydrogen, alkyl, cycloalkyl, aryl, aryl alkyl or halogen, wherein R⁴ in different units of one and the same polycarbosilane can also have different meanings, R⁵ alkyl, cycloalkyl, aryl, aryl alkyl or halogen, wherein R⁵ in different units of one and the same polycarbosilane can also have different meanings, R⁶ halogen, in particular fluorine or phenyl, wherein R⁶ in different units of one and the same polycarbosilane can also have different meanings, R⁷ hydrogen, halogen, in particular fluorine or phenyl, wherein R⁷ in different units of one and the same polycarbosilane can also have different meanings, m stands for the number 1 in case R⁶ and/or R⁷ represent phenyl, and stands for an integer of 1 to 6 in case R⁶ represents fluorine and R⁷ hydrogen or fluorine, wherein m in different units of one and the same polycarbosilane can also have different meanings, and p represents an integer of m to 2m−1, wherein p in different units of one and the same polycarbosilane can also have different meanings are used in a further embodiment of the invention as starting compounds.

As preferred compounds of the general formula IV, poly-diphenylcarbosilane or poly(diphenyl-co-dimethyl) carbosilane which can be produced according to EP 0 460 556, are used as starting compound for the synthesis of the solids according to the invention.

Polysilazanes can also be used as starting compounds within the meaning of the invention.

As already stated, the organofunctional compounds may also contain elements of the fifth or sixth main group of the periodic system of elements, preferably nitrogen, sulfur, phosphorus, in chemically bound form.

The organofunctional compounds can be used both alone and as a mixture or solution.

In another preferred variant, organofunctional compounds can be used as starting compounds which contain thermally decomposable and/or oxidizable residues. Preferably suited as such is the corresponding acid ester, such as tetrapropylorthotitanate or circonate, aluminum isopropylate.

According to the invention the organofunctional starting compounds are converted in an oxygen- or ozone-containing gas atmosphere at ambient temperature, preferably at elevated temperatures, into the microporous solids for producing the microporous solids.

The oxygen concentration is preferably 5 to 100%, the temperature 100 to 600° C., preferably 200 to 500° C.

The conversion into the microporous solids takes place in that the organofunctional compounds are tempered in an oxygen- or ozone-containing gas atmosphere, first at a temperature of 100 to 200° C. ($T_1$), preferably at 200° C., and are subsequently calcined after the temperature has been increased to 600° C. at the most, preferably at temperatures of 300 to 500° C. ($T_2$).

Solid, glass-like, non-porous solids which can be allowed to stand or can be stored in air for any desired period of time are first formed during tempering at preferably 200° C. The organofunctional ones of the starting compounds are oxidized by the further tempering or calcining of these solids at elevated temperatures, preferably at 300 to 500° C., and the oxidic microporous solid of the invention is obtained. The cooled product can also be stored in air for any desired period of time without any change in structure.

When the solids formed after tempering at $T_1$ are exposed to temperature $T_2$ for an excessively long period of time or when an excessively high temperature $T_2$ is chosen, the microporous structure will be expanded again, resulting in mesoporous or even macroporous solids.

The reaction time for achieving the microporous structure can last up to 75 hours, depending on the selection of the temperature ranges and the starting compounds.

In another embodiment, oxidic solids based on silicon dioxide or aluminum oxide or aluminum phosphate, e.g. silica gel, Aerosile, Xerogele or aluminosilicate, are impregnated with said organofunctional compounds once or repeatedly to produce microporous solids and are subsequently treated thermally at 100 to 600° C., preferably at 200 to 500° C., in the presence of oxygen, ozone-containing gases or air.

It is also possible to coat these oxidic solids with the said organofunctional compounds once or repeatedly and then to treat them thermally at 100 to 600° C., preferably at 200 to 500° C., also in the presence of oxygen-, ozone-containing gases or air.

Furthermore, it is possible to mix the organofunctional compounds with an aluminate and/or silicate solution, preferably sodium silicate solution, in the presence of oxygen-, ozone-containing gases or air prior to or after their thermal treatment, and to further treat them according to the sol-gel method.

When the organofunctional compounds are mixed with an aluminate and/or silicate solution prior to their thermal treatment and are further treated according to the sol-gel method according to DE 29 17 314, a thermal treatment must be carried out in the presence of oxygen-, ozone-containing gases or air to form the uniform micropore structure.

However, when already thermally treated organofunctional compounds, i.e. the microporous solids of the invention, are mixed with an aluminate and/or silicate solution and are further treated according to the sol-gel method, a subsequent thermal treatment according to the invention is not absolutely necessary. A standard drying operation at temperatures of up to 200° C. is sufficient.

The sol-gel method applied to these production variants for producing oxidic solids preferably corresponds to the method explained in DE 29 17 313.

Following the steps described therein, further steps, such as ageing, base exchange, washing, deionization, drying or tempering, can be performed.

Details of the process can be gathered from DE 29 17 313.

In a preferred variant within the meaning of the invention, the material which has been precipitated according to the sol-gel method is thermally treated in the presence of oxygen-, ozone-containing gases or air at 100 to 600° C.

The amorphous microporous oxidic solids of the invention have a pore size of 0.3 to 2 nm, a pore volume of 0.65 to 0.9 ml/g and a BET surface of 10 to 1000 m²/g and are especially suited for substance separation in liquid or gaseous media because of these properties.

It is also possible to fix the solids of the invention, for instance, on apparatus parts consisting of a metal, a ceramic or plastic material. Apparatus parts coated in this manner can, e.g., be used in the technical field of air-conditioning.

Embodiments 100 g of the starting compounds listed in Table 1 are respectively heated to 200° C. ($T_1$) and left at this temperature for 16 hours. The starting compound solidifies and forms a solid, glass-like non-porous solid. Subsequently, the solid is further tempered or calcined with increase in temperature ($T_2$). The organofunctional groups of the starting compounds are oxidized at these temperatures, resulting in the oxidic, microporous solid.

TABLE 1

| Sample | Starting compound | T1 ° C. | T2 ° C. | BET m²/g | Vp ml/g | dp nm |
|---|---|---|---|---|---|---|
| 1 | hexadecyltri-methoxysilane | 200 | 300 | 466 | 0.19 | 0.7 |
| 2 | oligomeric methyl-1-octylmethoxy-silane | 200 | 300 | 550 | 0.22 | 0.7 |
| 3 | octyltri-methoxysilane | 200 | 400 | 276 | 0.14 | 1.4 |
| 4 | octadecyltri-methoxysilane | 200 | 400 | 728 | 0.30 | 0.7 |
| 5 | bis(3-tri-ethoxysilyl-propyl) tetra-sulfane | 200 | 300 | 606 | 0.25 | 0.7 |
| 6 | silicone rubber | 200 | 300 | 349 | 0.21 | 1.8 |
| 7 | polydiphenyl-carbosilane D-PPC | 200 | 380 | 412 | 0.17 | 0.6 |
| 8 | poly(diphenyl-co-dimethyl)-carbosilane D-PPMC-1 | 200 | 420 | 456 | 0.24 | 1.6 |
| 9 | aluminum isopropylate | 200 | 200 | 511 | 0.39 | 0.9 |

BET = BET surface
Vp = pore volume
dp = mean pore diameter, determined according to Horwath-Kawazoe The diagrams show the sorption isotherms and pore volume distribution curves of samples 4, 5, 7.

I claim:

1. A microporous oxidic solid, comprising:
   at least one metal, transition metal or semiconductor element selected from the group consisting of the third group, fourth group and the fourth sub-group of the periodic system of elements,
   said oxidic solid having a pore size of 0.3 to 2 nm; a pore volume of 0.05 to 0.9 ml/g; and a BET surface of 10 to 1000 m²/g, and being produced by thermally treating an organic compound comprising said at least one metal, transition metal or semiconductor element at 100 to 600° C. in the presence of at least one gas selected from the group consisting of ozone, oxygen and air,
   wherein said organic compound is represented by the general formula I $$MX_aR_b \qquad (I)$$

wherein
   M is at least one element of the third group, fourth group and the fourth sub-group of the periodic system of elements, X is hydrogen, halogen or —OR¹,
   R is alkyl, alkylene, aryl, or alkylaryl,
   R¹ is hydrogen, alkali metal, alkyl, alkoxy or aryl,
   a is 1 to 4, and
   b is 4 minus a.

2. A microporous oxidic solid according to claim 1, produced by tempering or calcining said organic compound.

3. A microporous oxidic solid according to claim 1, wherein said organic compound has been thermally treated at 200 to 500° C.

4. A microporous oxidic solid according to claim 1, wherein said organic compound further comprises chemically bound elements of the fifth or sixth group of the periodic system of elements.

5. A microporous oxidic solid according to claim 4, wherein said chemically bound elements are selected from the group consisting of nitrogen, sulfur, and phosphorus.

6. A microporous oxidic solid according to claim 1, wherein said organic compound comprises at least one residue selected from the group consisting of thermally decomposable and oxidizable residues.

7. A microporous oxidic solid according to claim 1, wherein an oxidic solid has been impregnated or coated at least once with said organic compound and has been thermally treated at 100 to 600° C. in the presence of at least one gas selected from the group consisting of ozone, oxygen and air.

8. A microporous oxidic solid according to claim 7, wherein said oxidic solid is selected from the group consisting of silica gel, silicon oxide, aluminum oxide, aluminum phosphate, and aluminosilicate.

9. A microporous oxidic solid according to claim 7, wherein said impregnated or coated oxidic solid has been thermally treated at 200 to 500° C.

10. A microporous oxidic solid according to claim 1, wherein said organic compound has been mixed with at least one solution selected from the group consisting of an aluminate solution and a silicate solution prior to said thermally treating.

11. A microporous oxidic solid according to claim 1, wherein said microporous oxidic solid is mixed with at least one solution selected from the group consisting of an aluminate solution and a silicate solution after said thermally treating.

12. A microporous oxidic solid according to claim 1, wherein said at least one metal, transition metal or semiconductor element is selected from the group consisting of silicon, titanium, hafnium, zircon, aluminum, and germanium.

13. An adsorbent comprising a microporous solid according to claim 1.

14. A catalyst comprising a microporous solid according to claim 1.

15. A catalyst carrier comprising a microporous solid according to claim 1.

16. A microporous oxidic solid, comprising:
    at least one metal, transition metal or semiconductor element selected from the group consisting of the third group, fourth group and the fourth sub-grout of the periodic system of elements,
    said oxidic solid having a pore size of 0.3 to 2 nm; a pore volume of 0.05 to 0.9 ml/q; and a BET surface of 10 to 1000 m²/g, and being produced by thermally treating an organic compound comprising said at least one metal, transition metal or semiconductor element at 100 to 600° C. in the presence of at least one gas selected from the group consisting of ozone, oxygen and air, wherein said organic compound is a polysiloxane represented by the general formula II $$(R^2)_3Si-(O-Si(R^2)_2)_n-O-Si(R^2)_3 \quad (II)$$

wherein $R^2$ is hydrogen, alkyl, aryl or alkoxy, n is an integer, and $R^2$ in different units of the same polysiloxane can be different.

17. A microporous oxidic solid, comprising:

at least one metal, transition metal or semiconductor element selected from the group consisting of the third group, fourth group and the fourth sub-group of the periodic system of elements, said oxidic solid having a pore size of 0.3 to 2 nm; a pore volume of 0.05 to 0.9 ml/g; and a BET surface of 10 to 1000 m²/g, and being produced by thermally treating an organic compound comprising said at least one metal, transition metal or semiconductor element at 100 to 600° C. in the presence of at least one gas selected from the group consisting of ozone, oxygen and air, wherein said organic compound is a polysiloxane represented by the general formula III $$((R^3)_2SiO)_x \quad (III)$$

wherein $R^3$ is alkyl, aryl or alkylaryl, x is an integer greater than 100, and $R^3$ in different units of the same polysiloxane can be different.

18. The microporous oxidic solid, comprising:

at least one metal, transition metal or semiconductor element selected from the group consisting of the third group, fourth group and the fourth sub-group of the periodic system of elements, said oxidic solid having a pore size of 0.3 to 2 nm; a pore volume of 0.05 to 0.9 ml/g; and a BET surface of 10 to 1000 m²/g, and being produced by thermally treating an organic compound comprising said at least one metal, transition metal or semiconductor element at 100 to 600° C. in the presence of at least one gas selected from the group consisting of ozone, oxygen and air, wherein said organic compound is a polycarbosilane represented by the general formula IV

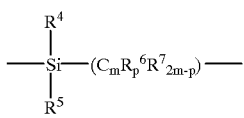

(IV)

wherein $R^4$ is hydrogen, alkyl, cycloalkyl, aryl, aryl alkyl or halogen, and $R^4$ in different units of the same polycarbosilane can be different, $R^5$ is alkyl, cycloalkyl, aryl, aryl alkyl or halogen, and $R^5$ in different units of the same polycarbosilane can be different, $R^6$ is fluorine or phenyl, and $R^6$ in different units of the same polycarbosilane can be different, $R^7$ is hydrogen, fluorine or phenyl, and $R^7$ in different units of the same polycarbosilane can be different, m is 1 if at least one of $R^6$ and $R^7$ is phenyl, and is an integer of 1 to 6 if $R^6$ is fluorine and $R^7$ is hydrogen or fluorine, and m in different units of the same polycarbosilane can be different, and p is an integer from m to 2m-1, and p in different units of the same polycarbosilane can be different.

19. A microporous oxidic solid according to claim 18, wherein at least one of $R^6$ and $R^7$ is fluorine.

20. A microporous oxidic solid, comprising:

at least one metal, transition metal or semiconductor element selected from the group consisting of the third group, fourth group and the fourth sub-group of the periodic system of elements, said oxidic solid having a pore size of 0.3 to 2 nm; a pore volume of 0.05 to 0.9 ml/g; and a BET surface of 10 to 1000 m²/g, and being produced by thermally treating an organic compound comprising said at least one metal, transition metal or semiconductor element at 100 to 600° C. in the presence of at least one gas selected from the group consisting of ozone, oxygen and air, wherein said organic compound is selected from the group consisting of dimethylphenylsilane, sodium trimethylsiliconate, tetraethoxysilane, hexadecyltrimethoxysilane, oligomeric methyl-1-octylmethoxysilane, tetrapropylsilicate, aluminum isopropylate, tetrabutylorthotitanate, tetrabutylzirconate, iron acetylacetonate, and octadecyltrimethoxysilane.

* * * * *